United States Patent
Sivashankar et al.

[19]

[11] Patent Number: 5,878,357
[45] Date of Patent: Mar. 2, 1999

[54] METHOD AND APPARATUS FOR VEHICLE YAW RATE ESTIMATION

[75] Inventors: Shiva N. Sivashankar, Canton; Ali Galip Ulsoy, Dexter; Davorin D. Hrovat, Dearborn, all of Mich.

[73] Assignee: Ford Global Technologies, Inc., Dearborn, Mich.

[21] Appl. No.: 706,866

[22] Filed: Sep. 3, 1996

[51] Int. Cl.$^6$ .................................................. B62D 6/00
[52] U.S. Cl. ........................... 701/1; 701/71; 701/72; 303/140; 303/146; 303/147
[58] Field of Search ................... 701/71, 72, 82, 701/41, 56; 303/140, 146, 147

[56] References Cited

U.S. PATENT DOCUMENTS

| | | | |
|---|---|---|---|
| 4,828,061 | 5/1989 | Kimbrough et al. | 180/79.1 |
| 4,832,149 | 5/1989 | Degonde | 180/141 |
| 4,840,389 | 6/1989 | Kawabe et al. | 280/91 |
| 4,842,089 | 6/1989 | Kimbrough | 180/79.1 |
| 4,969,212 | 11/1990 | Walter | 364/424.03 |
| 5,247,466 | 9/1993 | Shimada et al. | 364/566 |
| 5,348,111 | 9/1994 | Williams et al. | 180/140 |
| 5,369,580 | 11/1994 | Monji et al. | 364/424.01 |
| 5,371,677 | 12/1994 | Ehert et al. | 701/83 |
| 5,408,411 | 4/1995 | Nakamura et al. | 364/424.01 |
| 5,428,536 | 6/1995 | Ackermann | 364/424.05 |
| 5,700,073 | 12/1997 | Hawatashi et al. | 303/148 |
| 5,732,377 | 3/1998 | Eckert | 701/72 |

*Primary Examiner*—William A. Cuchlinski, Jr.
*Assistant Examiner*—Arthur Donnelly
*Attorney, Agent, or Firm*—Gregory P. Brown; Roger L. May

[57] ABSTRACT

A method is provided for a vehicle yaw rate estimation using two accelerometers and a steer angle sensor. The new method combines two complimentary approaches to yaw rate estimation using accelerometers. A kinematic yaw rate estimate is weighted with a vehicle lateral acceleration at the center of gravity, and steering angle and vehicle forward speed are incorporated into a Kalman filter for estimating vehicle yaw rate based upon the kinematic yaw rate estimate, the lateral acceleration at the center of gravity, the vehicle steering angle, and the vehicle forward speed. The method incorporates use of either one or two accelerometers.

9 Claims, 3 Drawing Sheets

METHOD AND APPARATUS FOR VEHICLE YAW RATE ESTIMATION

TECHNICAL FIELD

The present invention relates to vehicle yaw rate measurement, and more particularly to a method and apparatus using steering angle, forward speed and sensed accelerations to estimate yaw rate.

BACKGROUND ART

In recent years, there has been a tremendous increase in interest in advanced safety features in automobiles. This has led to the development of advanced vehicle chassis control systems such as anti-lock brakes (ABS), traction control (TC), four wheel steer (4WS), electronic stability program (ESP), etc. Yaw rate is an important element of the vehicle dynamics that influences the driver's (and passenger's) perception of vehicle handling and safety features. Hence, a considerable level of effort is being directed towards developing reliable and accurate methods to monitor and control the yaw rate of an automobile.

Referring to the vehicle schematic shown in FIG. 1, the vehicle heading angle $\psi(t)$, is defined as the angle between the inertial X-axis (of the inertial X-Y-Z coordinate frame) and the body fixed x-axis (of the vehicle-fixed x-y-z coordinate frame). The time rate of change of $\psi(t)$, with respect to the vehicle-fixed coordinate system x-y-z, is the yaw rate, $r(t)$. It is necessary to measure the vehicle yaw rate in various vehicle control applications, such as brake-steer, lateral dynamics control and safety warning systems such as collision warning and roadway departure warning systems. In order to measure the yaw rate, sensors are commercially available for use in vehicle control research. Currently, these sensors cost several hundred dollars each even in mass production quantities. This cost is extremely prohibitive for use in mass produced automobiles. Although it is expected that the cost of such sensors will be dramatically reduced in the future, it is of interest to consider methods to estimate the yaw rate accurately for near term use in vehicles.

The problem of estimating the yaw rate from vehicle acceleration measurements has already been considered (see U.S. Pat. No. 5,247,466). However, the approaches to date for yaw rate measurement using accelerometers have been based purely upon vehicle kinematics. Consequently, these methods are inherently sensitive to measurement noise.

DISCLOSURE OF THE INVENTION

The present invention overcomes the above referenced shortcomings of prior art yaw measurement techniques by providing a method and apparatus for estimating vehicle yaw rate in which at least one lateral accelerometer is secured to the vehicle, and the accelerometer readings, as well as steering angle and vehicle speed measurements, are used in conjunction with a Kalman filter for estimating yaw rate.

More specifically, the present invention provides a method of estimating vehicle yaw rate, comprising: (1) sensing lateral acceleration of the vehicle at two locations on the vehicle; (2) determining a kinematic estimate of yaw rate ($\hat{r}_0$) in accordance with the following formula:

$$\hat{r}_0 = \text{sign}(a_y) \frac{\sqrt{|a_{y1} - a_{y2}|}}{L_y}$$

where "sign" represents the sign of the variable ($a_y$), $a_y$ is the vehicle acceleration at its center of gravity (CG), $L_y$ is the distance between the two accelerometers along the width of the vehicle, and $a_{y1}$ and $a_{y2}$ represent the sensed lateral accelerations;
(3) determining the lateral acceleration ($a_y$) at the CG in accordance with the following formula:

$$a_y = \frac{a_{y1} + a_{y2}}{2};$$

(4) measuring steering angle ($\delta$) of the vehicle steering wheel; (5) measuring vehicle forward speed (u); and (6) estimating the vehicle yaw rate based upon $\hat{r}_0$, $a_y$, $\delta$, and u.

The present invention also provides an apparatus for estimating vehicle yaw rate, comprising first and second lateral accelerometers secured to the vehicle, means for measuring steering angle, means for measuring the vehicle forward speed, and a microcontroller in electrical communication with the accelerometers and with the means for measuring steering angle and forward speed. The microcontroller is operative to perform the method described above.

The present invention also provides a method of estimating vehicle yaw rate, comprising: (1) sensing lateral acceleration ($a_{CG}$) of the vehicle at the vehicle center of gravity (CG); (2) measuring the steering angle ($\delta$) of the vehicle steering wheel; (3) measuring the vehicle forward speed (u); and (4) using a Kalman filter to estimate vehicle yaw rate based upon $a_{CG}$, $\delta$, and u.

Accordingly, an object of the present invention is to provide a method and apparatus for measurement of yaw rate using at least one accelerometer, steering angle sensor and vehicle speed sensor with a Kalman filter in a manner which provides accurate results even with small signal to noise ratios in the accelerometer difference signals.

DETAILED DESCRIPTION OF THE PREFERRED EMBODIMENTS

Figure 1:
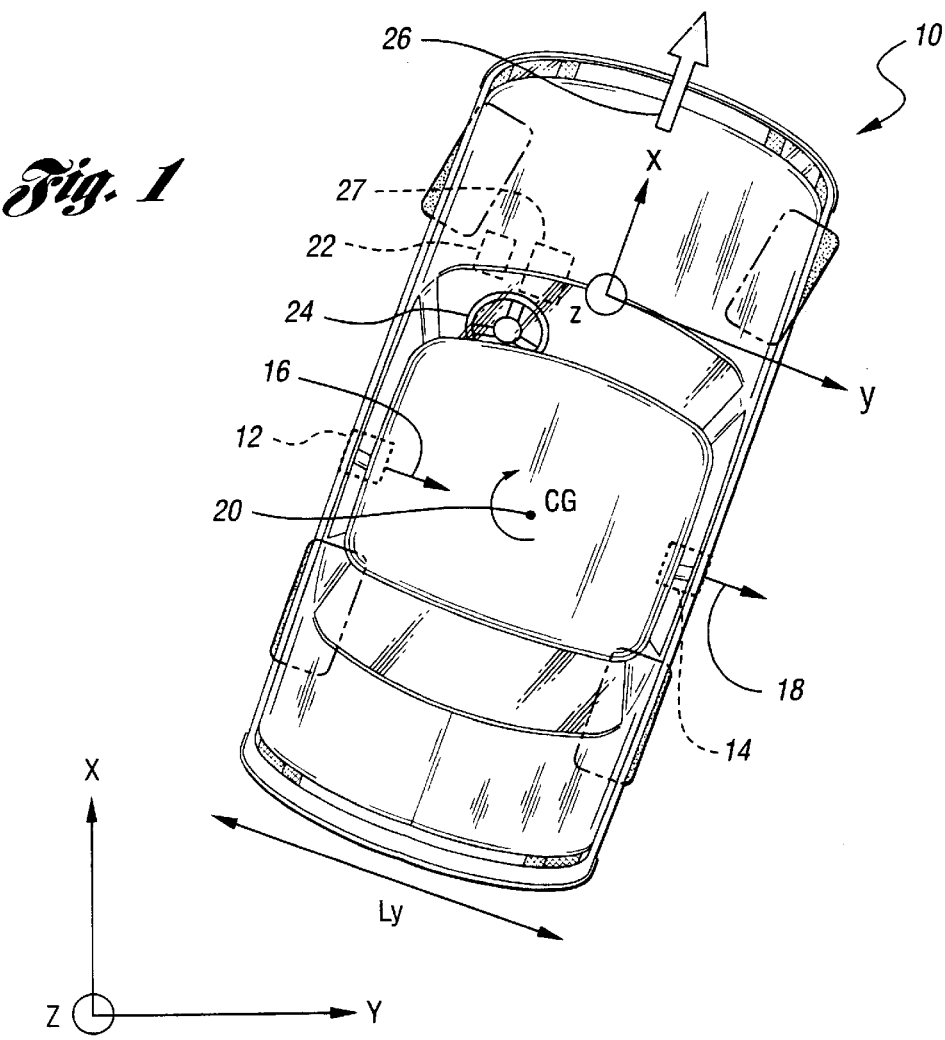
FIG. 1 shows a schematic illustration of a vehicle incorporating an apparatus for estimating yaw rate in accordance with the present invention.

As shown in FIG. 1, in accordance with the present invention, a vehicle 10 incorporates accelerometers 12,14 having sensitive axes 16,18 disposed laterally with respect to the vehicle and aligned with the center of gravity (CG) 20 of the vehicle. A steering angle sensor 22 is provided for measuring the steering angle of the steering wheel 24, and means for measuring vehicle forward speed 26 is provided. The steering angle sensor 22 would likely be available as part of an active safety or a vehicle control system where the yaw rate is monitored or controlled, and the vehicle forward speed measurement 26 does not have to be extremely accurate, such that the vehicle speedometer or that used in the ABS module would be sufficient. A microcontroller 27 is provided for performing the functions necessary to estimate vehicle yaw rate.

In principle, the yaw rate can be estimated using just two accelerometers. The method is purely based on vehicle kinematics and is affected significantly by problems such as sensor drift and noise. The yaw rate can also be estimated using a single accelerometer and a steering angle sensor. This method uses a dynamic Kalman filter as an estimator and is affected by vehicle disturbances such as wind gusts, superelevation, etc. Since this estimator uses a linear model of the vehicle dynamics, the estimate is poor during extreme maneuvers of the vehicle. The present invention exploits the advantages of these two complementary methods. It has shown good results in linear and non-linear simulations. An inexpensive approach to measure the yaw rate will be important for future commercialization of certain advanced vehicle control systems such as intelligent chassis control systems, collision warning and avoidance systems.

The problem of estimating the yaw rate from vehicle acceleration measurements has already been considered (see U.S. Pat. No. 5,247,466). However, the approaches to date for yaw rate measurement using accelerometers have been based purely upon vehicle kinematics. Consequently, these methods are inherently sensitive to measurement noise. No known methods use both kinematic and model based dynamic approaches to estimate yaw rate.

The proposed approach to yaw rate measurement combines two complementary approaches.

Approach 1

A kinematic estimate of the yaw rate can be obtained using two accelerometers 12,14 that are placed at the left and right sides of the vehicle 10 (see FIG. 1). These accelerometers are positioned to measure the lateral acceleration (i.e., acceleration along the body fixed y axis) of the vehicle. If $a_{y1}$ and $a_{y2}$ represent the lateral accelerations measured by the two accelerometers, $a_y$ the acceleration at CG and $L_y$ the distance between the two accelerometers along the width of the vehicle then the kinematic estimate of the yaw rate is $$\hat{r}_0 = \text{sign}\,(a_y) \frac{\sqrt{|a_{y1} - a_{y2}|}}{L_y} \quad (1)$$

where sign (.) represents the sign (+ve or −ve) of the variable. This estimate is relatively insensitive to disturbances acting on the vehicle. However, this estimate is good only if (in addition to other conditions) the signal-to-noise ratio in the difference signal ($a_{y1} - a_{y2}$) is large. During vehicle maneuvers when the yaw rate is small, the noise completely dominates the difference signal and the estimate is poor. Another drawback of using the relationship in Equation (1) is its inability to predict the sign of the yaw rate (+ve or−ve) under transient conditions. The sign of $\hat{r}_0$ is the same as the sign of $a_{y1}$ and $a_{y2}$ under steady state conditions. This fact is utilized to predict the sign of yaw rate in prior work ['466 patent]. But, under transient conditions, the signs can be different. In many vehicle dynamics control situations where yaw rate is to be monitored (and possibly controlled), the sign of the yaw rate estimate and its accuracy at lower values may play an important role. Hence, this approach may not provide satisfactory results. This method of estimating the yaw rate is described below in the "Kinematic Estimate" section.

Approach 2 a dynamic estimate of the yaw rate can be derived using a simple linear model of the vehicle. The lateral acceleration at the CG can be derived from the two accelerometers as $$a_y = \frac{a_{y1} + a_{y2}}{2} \quad (2)$$

This lateral acceleration at the CG can be used as a measurement to a linear model based Kalman filter to estimate the yaw rate. The advantage of this approach is that the effect of sensor noise can be minimized during the filter design process. Also, the dynamic estimate predicts the sign of the yaw rate well during transients. However, the estimator requires the steering angle and vehicle forward speed. (i.e., vehicle speed along the body fixed x-axis) information. This is not a major handicap since (a) the steering input of the driver is usually monitored in vehicle control applications where yaw rate is monitored, and (b) the filter is robust enough to use the vehicle speed measurement that is either used in the ABS module or used for the speedometer display. The primary limitation of this approach is that the linear estimator model of the vehicle breaks down for larger values of yaw rate due to dominance of the non-linear effects such as those due to forward speed and tire nonlinearities. Hence, this approach is inappropriate for extreme maneuvers of the vehicle when the yaw rate is large.

Combined Approach

It is clear from the above discussion that the measurements from the two approaches complement each other. While the dynamic estimate (Approach 2) is good for low values of yaw rate, the kinematic estimate (Approach 1) is good for higher values of yaw rate. We have exploited this complementary property in our filter design (see FIG. 2). This filter uses the kinematic raw yaw rate estimate $\hat{r}_0$, the vehicle lateral acceleration $a_y$, the steering angle and the vehicle speed information as inputs. Depending on the measurement noise characteristics, it chooses a judicious combination of the kinematic and the dynamic estimate. In the limit, when the yaw rate is really small, the filter output is primarily a function of the dynamic estimate. On the other hand, when the yaw rate is very large, the filter output depends primarily on the kinematic estimate. Our combined approach to yaw rate estimation is described in the "Combined Estimator" section below.

Since our combined estimator uses the two degree-of-freedom linear model for yaw rate estimation, it needs information on the forward speed. The speed information can be used either in a continuously time-varying filter to estimate the yaw rate or in a gain scheduled time-invariant filter. We have chosen a gain scheduled time-invariant filter to estimate the yaw rate. A complete description of this gain scheduled filter follows in the "Gain-Scheduled Estimator" section below.

We have modeled the accelerometer dynamics using a first-order high pass filter and used an additive measurement noise $w_y$ to corrupt the measured acceleration. This model is represented as $$\dot{x}_s = a_s(a_y - x_s) \quad (3)$$

$$a_{ys} = K_s(a_y - x_s) + w_y$$

where the actual lateral acceleration is denoted by $a_y$ and the sensor output by $a_{ys}$. The first-order high pass filter has a gain of $K_s$ and a time constant of $(1/a_s)$. The sensor state is denoted as $x_s$. The high pass nature of the sensor model reflects the fact that inexpensive accelerometers have DC drift, and therefore the DC information is filtered as part of the sensor signal amplification to eliminate this problem. However, the dc information is lost in this process. Thus, the sensed (as opposed to the actual) accelerations have a subscript "s" and these include the effects of sensor noise and dynamics.

Kinematic Estimate

As described above, the kinematic estimate of the yaw rate is obtained from two lateral accelerometers that are placed on the vehicle as shown schematically in FIG. 1. One can use other configurations to estimate the yaw rate using two accelerometers.

Consider the accelerometer configuration in FIG. 1. These accelerometers measure the following quantities along the body fixed y-axis (assuming sufficiently small roll and pitch rates, and assuming that the accelerometers are placed in the same vertical position as the CG along the length of the vehicle):

$$a_{y1} = a_y + L_{y1} r^2 = \dot{v} + u_0 r + L_{y1} r^2 \quad (4)$$

$$a_{y2} = a_y - L_{y2} r^2 = \dot{v} + u_0 r - L_{y2} r^2 \quad (5)$$

where $a_y$ is the lateral acceleration at the center of mass, r is the yaw rate, $L_{y1}$, $L_{y2}$ are the distances of the two accelerometers from the center of mass along the body fixed y-axis. Notice that $L_y = L_{y1} + L_{y2}$. Using the sensed lateral accelerations, the lateral acceleration at the center of mass of the vehicle can be computed as:

$$a_{ys} = \frac{a_{ys1} + a_{ys2}}{2} = \dot{v} + u_0 r \quad (6)$$

The kinematic estimate of the yaw rate can be computed from (4) and (5) as in Equation (1):

$$\hat{r}_0 = \text{sign}(a_{ys}) \frac{\sqrt{|a_{ys1} - a_{ys2}|}}{L_y} \quad (7)$$

This relationship is independent of the speed of the vehicle, the location of the yaw axis of rotation of the vehicle and disturbances such as wind gusts acting on the vehicle. From the above equation, it seems as though the yaw rate can be obtained by a simple operation on the accelerometer outputs. However, the above formula gives a good estimate of the yaw rate if:

1. The accelerometers are aligned along the length of the vehicle. If this condition is not satisfied then the quantity $(a_{ys1} - a_{ys2})$ is corrupted by other vehicle variables and Equation (7) is a poor estimate of vehicle yaw rate.
2. The pitch and roll rates of the vehicle are small compared to the yaw rate. If not, $a_{ys1}$ and $a_{ys2}$ are corrupted by other vehicle variables and equations (4)–(5) are poor approximations.
3. The signal-to-noise ratio in the difference signal $(a_{ys1} - a_{ys2})$ is large.

Figure 3:
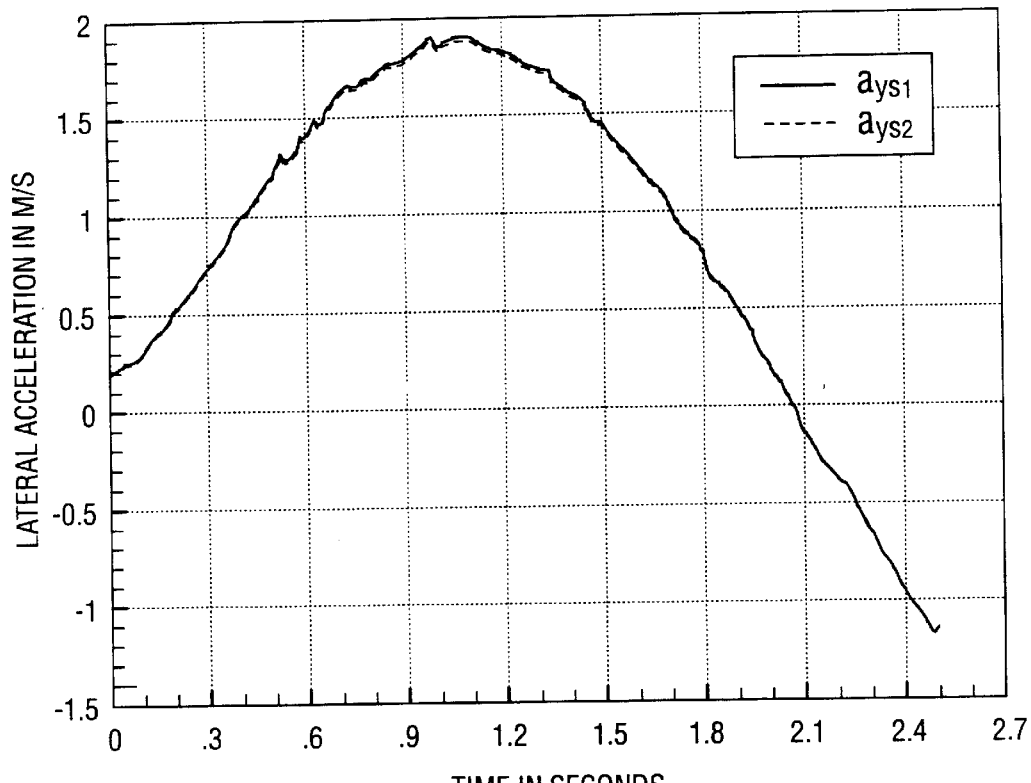
FIG. 3 shows a graphical illustration of lateral acceleration vs. time taken from accelerometers illustrated in FIG. 1.
Figure 4:
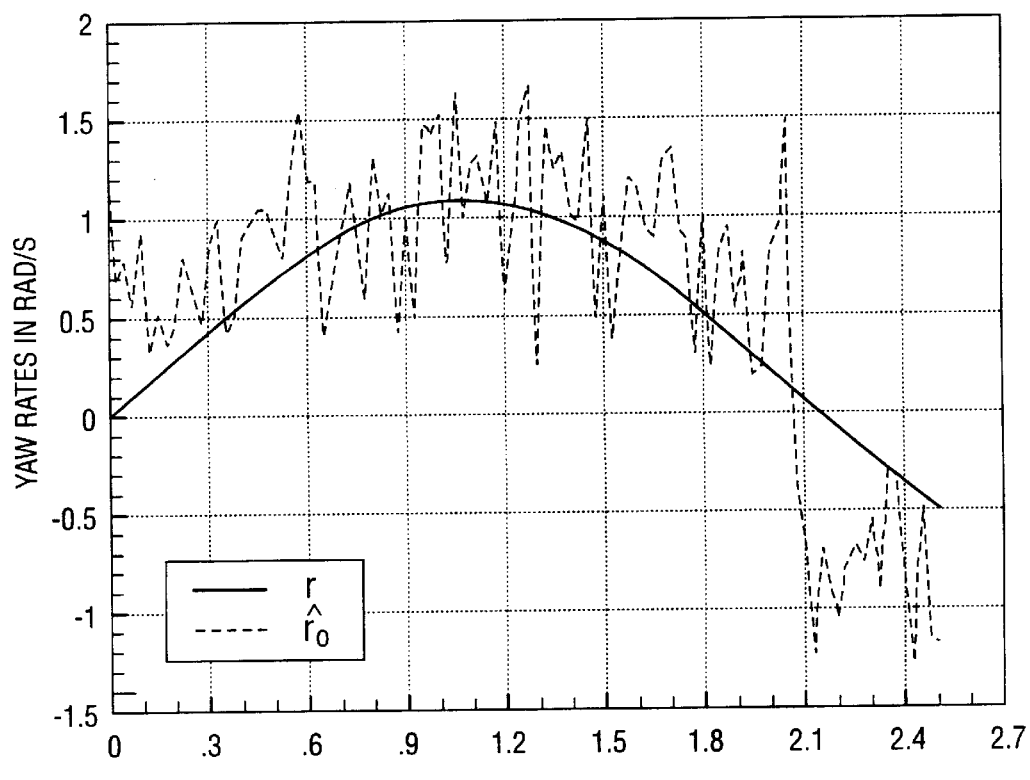
FIG. 4 shows a graphical illustration of yaw rate vs. time for actual yaw rate (r) and the kinematic estimate ($\hat{r}_0$)

The conditions (1) and (2) are easily satisfied for most of the maneuvers of the vehicle by appropriate placement of the accelerometers. However, condition (3) is not satisfied for vehicle maneuvers which result in lower values of yaw rate. This is demonstrated in FIGS. 3 and 4 using simulation data. The lateral accelerometer measurements are plotted in FIG. 3 ('ays1' and 'ays2' in the plot) while the corresponding yaw rate estimate ($\hat{r}_0$) and the actual yaw rate from the vehicle model ('r') are plotted in FIG. 4. It is clear that although the individual accelerometer values are large, the difference signal is small. Hence the difference signal is dominated by sensor noise which results in a poor kinematic estimate of the yaw rate.

Consider the kinematic estimate of the yaw rate in (7). Although the sign of the yaw rate is the same as the sign of the lateral accelerations from the two sensors in steady state, the signs may be different under transient conditions. Hence, this approach to yaw rate estimation may be inaccurate under transient conditions.

It is clear from the above discussion that the kinematic estimate, $\hat{r}_0$, is robust in the presence of external disturbances such as wind gusts and superelevation. However, as detailed above, the estimate degrades considerably in the presence of sensor noise.

Dynamic Estimate (Single Accelerometer)

Figure 6:
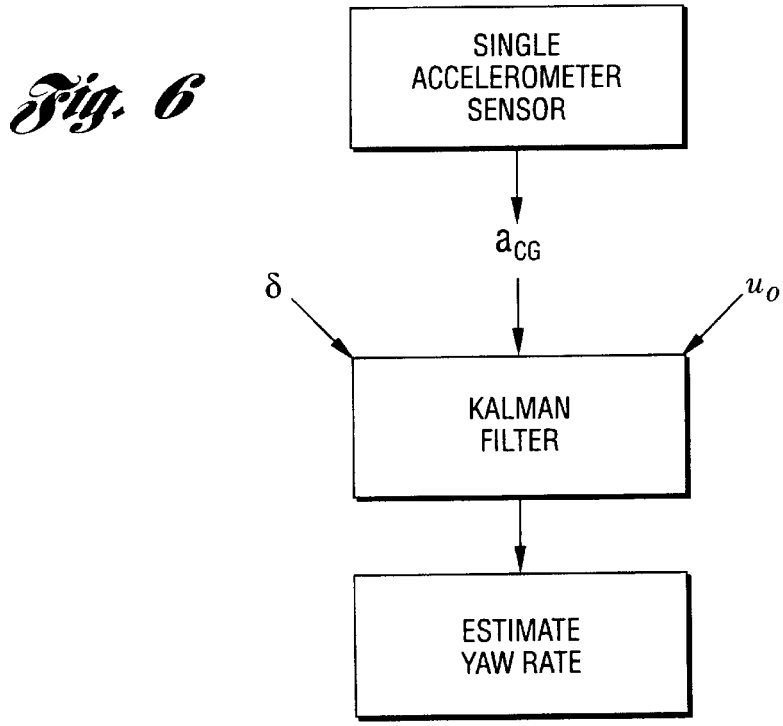
FIG. 6 shows a schematic flow diagram of a method of estimating the vehicle yaw rate in accordance with a second embodiment of the present invention.

As an alternative to the kinematic estimate, one can generate an estimate of the yaw rate using only a single accelerometer by utilizing a dynamic model of the vehicle and applying state estimation (e.g., Kalman filtering) techniques. The method is broadly summarized in the flow diagram FIG. 6. It utilizes a Kalman filter with the following three states:

v: the lateral velocity (m/s)

r: the yaw rate (rad/s)

$x_s$: sensor state and a single measurement as the input to the Kalman filter:

$a_{ys}$: the measured lateral acceleration at the center of mass (m/s$^2$).

The steer angle input to the vehicle (at the front wheel) and vehicle forward speed (preferably obtained from the ABS module in the vehicle) are also assumed to be measured and used in the estimator.

δ: front wheel steer angle (rad)

$u_0$: vehicle forward speed (m/s)

A linear two degree-of-freedom vehicle dynamics model is used as the basis for the Kalman filter design. The two degree-of-freedom bicycle model of the vehicle is represented as $$\dot{x} = Ax + bu + w$$

where $x = [v \ r \ x_s]'$ is the vector of state variables defined above, $u = \delta$ is the steer angle input, and $w := [w_1 \ w_2 \ w_3]'$ is the process noise. The matrices A and b are described as $$A = \begin{bmatrix} \frac{C_{\alpha f} + C_{\alpha r}}{m u_0} & \frac{aC_{\alpha f} - bC_{\alpha r} - m u_0^2}{m u_0} & 0 \\ \frac{aC_{\alpha f} - bC_{\alpha r}}{I_z u_0} & \frac{a^2 C_{\alpha f} + b^2 C_{\alpha r}}{I_z u_0} & 0 \\ \frac{a_s(C_{\alpha f} + C_{\alpha r})}{m u_0} & \frac{a_s(aC_{\alpha f} - bC_{\alpha r})}{m u_0} & -a_s \end{bmatrix} \quad b = \begin{bmatrix} \frac{-C_{\alpha f}}{m} \\ \frac{-aC_{\alpha f}}{I_z} \\ \frac{-a_s C_{\alpha f}}{m} \end{bmatrix}$$

where $C_{\alpha f}$ and $C_{\alpha r}$ are the effective cornering stiffness for the front and rear tires respectively, m is the mass of the vehicle, $I_z$ is the moment of inertia of the wheel, a and b are the distances of the front and rear axles from the mass center along the body fixed x-axis. The parameters $a_s$ and $K_s$ represent the eigenvalue and gain of the accelerometer high pass dynamics (see equation (3)) respectively. The output equation associated with the system is given by, $$y = a_{ys} = cx + du + w_y$$

where $$\acute{c} = \left[ \frac{K_s(C_{\alpha f} + C_{\alpha r})}{mu_0} \quad \frac{K_s(aC_{\alpha f} - bC_{\alpha r})}{mu_0} - K_s \right] d = \frac{-K_s C_{\alpha f}}{m}$$

and $w_y$ is the measurement noise.

The resulting Kalman filter state equation is $$\hat{x} = A\hat{x} + bu + k(y - \hat{y})$$

where $\hat{x}$ is the vector of estimates of the state variables in x defined above, $u = \delta$ is the steer angle input, $y = a_{ys}$ is the measurement, $\hat{y}$ is an estimate of the measurement and k is the Kalman filter gain. The matrices A and b are as derived above for the two degree-of-freedom bicycle model with the accelerometer sensor dynamics. The corresponding estimate of the output $\hat{y}$ in the Kalman filter is obtained as $$\hat{y} = \acute{c}\hat{x} + du$$

The performance of this single-sensor estimate may deteriorate during extreme maneuvers of the vehicle. To account for the extreme maneuvers the filter can be gain-scheduled on forward speed, steer angle and surface coefficient of friction. The method is similar to the one described in the "Gain Scheduled Estimator" section below. The gain-scheduled estimator considerably improves the base single sensor estimate.

Combined Estimator

Figure 2:
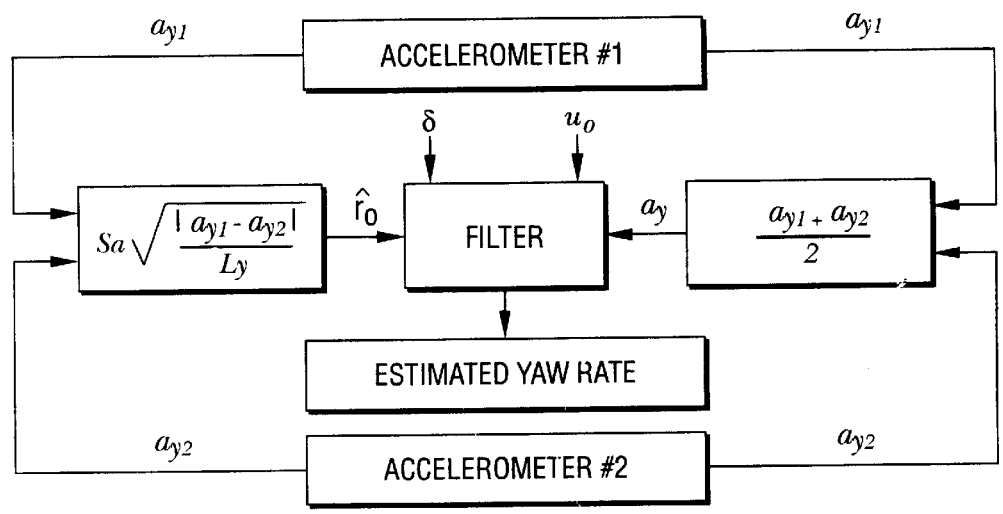
FIG. 2 shows a schematic flow diagram of a method of estimating vehicle yaw rate in accordance with the present invention.

In this subsection, we describe an estimator which combines the complementary features of the kinematic estimator and a dynamic estimator. The combined estimator is schematically illustrated in FIG. 2. It utilizes a Kalman filter with the following four states:

v: the lateral velocity r: the yaw rate $e_r$: yaw disturbance $x_s$: sensor state and the following two measurements:

$a_{ys}$: the measured lateral acceleration at the center of mass $\hat{r}_0$: the kinematic yaw rate estimate The steer angle input to the vehicle (at the front wheel), $\delta$, and vehicle forward speed (preferably obtained from the ABS module in the vehicle), $u_0$ are also assumed to be measured and used in the estimator.

A linear two degree-of-freedom vehicle dynamics model is used as the basis for the Kalman filter design. The two degree-of-freedom bicycle model of the vehicle is represented as $$\dot{x} = Ax + B\delta + w \qquad (8)$$

where $x := [v \; r \; e_r \; x_s]'$ is the vector of state variables defined above, $\delta$ is the steer angle input, and $w := [w_1 \; w_2 \; w_3 \; w_3]'$ is the process noise. The matrices A and B are described as:

$$A = \begin{bmatrix} \frac{C_{\alpha f} + C_{\alpha r}}{mu_0} & \frac{aC_{\alpha f} - bC_{\alpha r} - mu_0^2}{mu_0} & 0 & 0 \\ \frac{aC_{\alpha f} - bC_{\alpha r}}{I_z u_0} & \frac{a^2 C_{\alpha f} + b^2 C_{\alpha r}}{I_z u_0} & 1 & 0 \\ 0 & 0 & 0 & 0 \\ \frac{a_s(C_{\alpha f} + C_{\alpha r})}{mu_0} & \frac{a_s(aC_{\alpha f} - bC_{\alpha r})}{mu_0} & 0 & -a_s \end{bmatrix} \qquad (9)$$

$$B' = \left[ \frac{-C_{\alpha f}}{m} \quad \frac{-aC_{\alpha f}}{I_s} \quad 0 \quad \frac{-a_s C_{\alpha f}}{m} \right] \qquad (10)$$

The output equation associated with the system is given by, $$y = \begin{bmatrix} a_{ys} \\ \hat{r}_0 \end{bmatrix} = \acute{c}x + d\delta + w_y \qquad (11)$$

where $$\acute{c} = \begin{bmatrix} \frac{K_s(C_{\alpha f} + C_{\alpha r})}{mu_0} & \frac{K_s(aC_{\alpha f} - bC_{\alpha r})}{mu_0} & 0 & -K_s \\ 0 & 1 & 0 & 0 \end{bmatrix} \qquad (12)$$

$$d = \begin{bmatrix} \frac{-K_s C_{\alpha f}}{m} \\ 0 \end{bmatrix} \qquad (13)$$

and $w_y$ is the measurement noise.

The resulting Kalman filter state equation is:

$$\dot{\hat{x}} = A\hat{x} + B\delta + k(y - \hat{y}) \qquad (14)$$

where $\hat{x}$ is the vector of estimates of the state variables in x defined above, $y = [a_{ys} \; \hat{r}_0]'$ is the measurement, $\hat{y}$ is an estimate of the measurement and k is the Kalman filter gain. The matrices A and B are as derived above for the two degree-of-freedom bicycle model with the accelerometer sensor dynamics. The corresponding estimate of the output $\hat{y}$ in the Kalman filter is obtained as:

$$\hat{y} = \acute{c}\hat{x} + d\delta \qquad (15)$$

The process and measurement noise terms in Equations (8) and (11) are assumed to be independent, zero-mean, and normally distributed. The selection of these noise terms is instrumental in determining the specific value of the Kalman filter gains in (14). Essentially, the smaller the variance of the measurement noise (relative to the process noise), the larger the gains associated with the measurement signal.

Essentially, this combined Kalman filter provides an optimal trade-off between the kinematic estimate $\hat{r}_0$ that is corrupted by noise and the smoother dynamic estimate that is sensitive to vehicle disturbances and modeling errors.

There are several important aspects of the Kalman filter design presented in this subsection. We have added the noise corrupted kinematic estimate of the yaw rate as a measurement input to the Kalman filter. This not only improves the estimate of the yaw rate, but changes the observability conditions and enables the inclusion of a yaw disturbance state ($e_r$) in the model. The yaw disturbance state is added to account for any unmeasured disturbances due to factors such as side wind, superelevation, etc. acting on the vehicle. Note that the two required measurements, i.e., $a_{ys}$ and $\hat{r}_0$, can be obtained from the two lateral accelerometer measurements $a_{ys1}$ and $a_{ys2}$ as shown previously in Equations (6) and (7).

Gain-Scheduled Estimator

Figure 5:
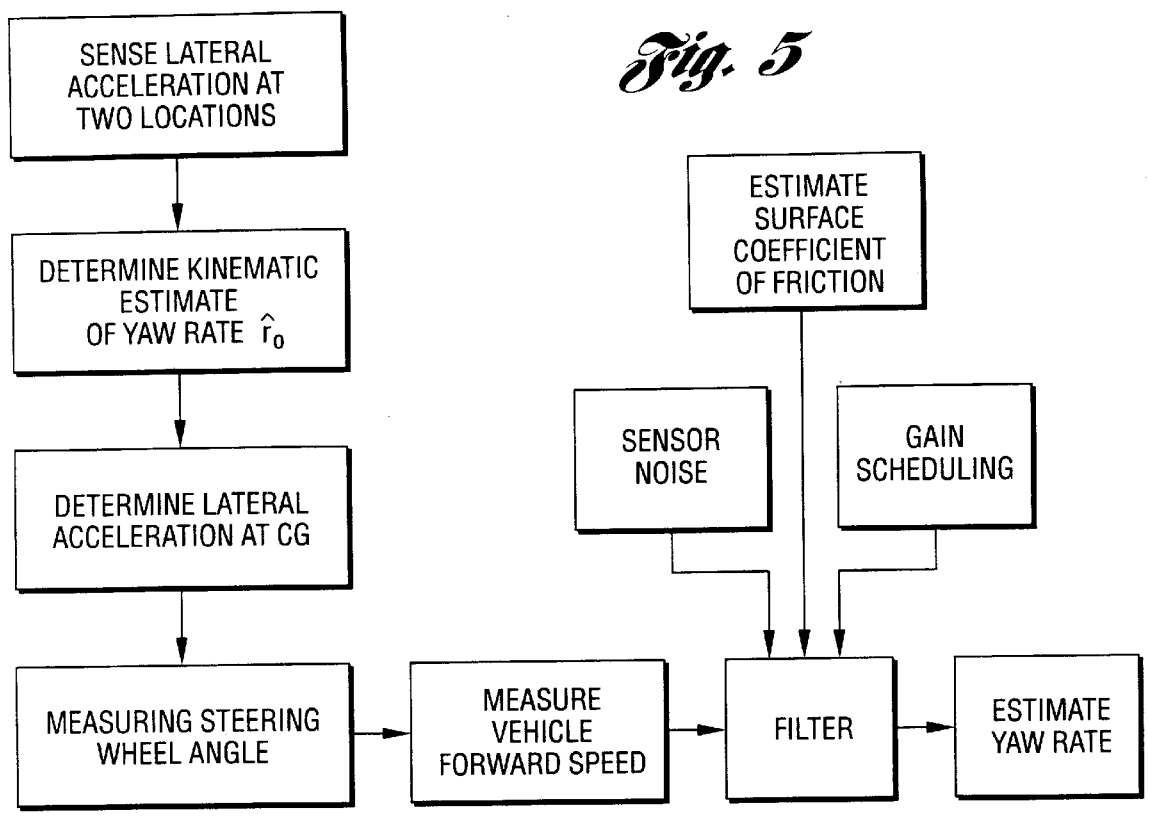
FIG. 5 shows a schematic flow diagram of a method of estimating vehicle yaw rate in accordance with the present invention.

The preferred method is summarized in the flow diagram of FIG. 5. The combined estimator developed in the previous subsection incorporates a linear two degree-of-freedom model of the vehicle. Recall that the linear two-degree-of-freedom model is obtained by linearizing the non-linear equations at the operating forward speed. Hence, a single linear model of the vehicle is insufficient to describe the motion of the vehicle for a wide range of speed variations, for example, speeds ranging from $u_0 = 15$ m/s ($\approx 33$ mi/hr) to $u_0 = 35$ m/s ($\approx 78$ mi/hr). The combined estimator, designed at a nominal forward speed, does not have good performance over the whole range of speed variations. It was also found that the performance of the combined estimator, described in the previous section, degraded when the vehicle experienced large yaw rates. This is because the vehicle dynamics departs considerably from the linear model under large yaw rate conditions. Hence, a single gain Kalman filter was found to be inadequate to operate accurately for a wide range of conditions. In order to address these issues, we have developed combined estimators for a few nominal values within the range of operating conditions and switch between these estimators depending on the conditions. The gain-scheduled estimator, which has a switchable gain, ensures good performance over all vehicle operating conditions. We described this estimator and the design process in this section.

We divided the domain of operation of the vehicle into four distinct regions.

1. low forward speed and low steer angle,
2. low forward speed and high steer angle,
3. high forward speed and low steer angle, and
4. high forward speed and high steer angle.

We designed a model based combined Kalman estimator for each of these four operating conditions. We used the forward speed ($u_0$) and the steer angle as gain-scheduling variables.

The design procedure is as follows. For a fixed low forward speed ($u_0$=20 m/s), we get a linear time-invariant model of the vehicle (Equations (9–13)). Using this linear model, we designed two Kalman filter gains, one for the low yaw rate condition and the other for the high yaw rate condition. Since the process model is fixed, the filter gains are strictly a function of the process and measurement noise characteristics. We picked the noise characteristics to reflect the following facts.

1. At low steer angle values, the signal-to-noise ratio of the accelerometer difference signal is small. The kinematic yaw rate estimate ($\hat{r}_0$) is poor. The filter should primarily depend on the vehicle model and the measurement of the acceleration at the CG (i.e., $a_{ys}=(a_{ys1}+a_{ys2})/2$) to estimate the yaw rate. Hence, the process noise covariance and the noise covariance of the $a_{ys}$ measurement are chosen smaller than the noise covariance of the $\hat{r}_0$ measurement in the filter design process.
2. At high steer angle values, the signal-to-noise ratio of the $\hat{r}_0$ measurement is large and the vehicle may be operating outside the linear region of operation. Hence, the noise covariance of the $\hat{r}_0$ measurement is chosen smaller than the process noise covariance and the noise covariance of the $a_{ys}$ measurement in the filter design process.

This method of picking the noise characteristics was repeated for a model of the vehicle linearized at a higher forward speed ($u_0$=30 m/s).

Thus, the structure of the gain-scheduled combined estimator is as follows:

$$\dot{\hat{x}}=A(u_0)\hat{x}+B\delta+k_i(y-\hat{y}) \qquad (16)$$

$$\hat{y}=\hat{c}(u_0)\hat{x}+d\delta \qquad (17)$$

where B and d are as in Equations (10) and (13), $A(u_0)$ and $c(u_0)$ are similar to A and c in Equations (9) and (12). However, these two matrices can take one of two values depending on the gain scheduled parameter $u_0$. The matrix k, takes one of four values and is defined as follows:

$$k_i = \begin{cases} k_1 \text{ if } |\delta| < \epsilon_1 \text{ and } |u_0| < \epsilon_2 \\ k_2 \text{ if } |\delta| > \epsilon_1 \text{ and } |u_0| < \epsilon_2 \\ k_3 \text{ if } |\delta| < \epsilon_1 \text{ and } |u_0| > \epsilon_2 \\ k_4 \text{ if } |\delta| > \epsilon_1 \text{ and } |u_0| > \epsilon_2 \end{cases} \qquad (18)$$

The constants $\epsilon_1$ and $\epsilon_2$ are fixed thresholds for the two gain scheduling variables. This is a realization of a two variable gain scheduled Kalman filter. One can incorporate additional thresholds on the speed variable to extend the range of operation of this filter.

The performance of the filter on slippery surfaces can be enhanced by using an estimate of surface coefficient of friction ($\mu$). As estimate of $\mu$ can be used to change $C_{\alpha f}$ and $C_{\alpha r}$ parameters in the filter. $\mu$ can be estimated as provided in U.S. Pat. No. 5,278,761.

While the best modes for carrying out the invention have been described in detail, those familiar with the art to which this invention relates will recognize various alternative designs and embodiments for practicing the invention within the scope of the appended claims.

What is claimed is:

1. A method of estimating vehicle yaw rate, comprising:

sensing lateral acceleration of the vehicle at two locations on the vehicle;

determining a kinematic estimate of yaw rate ($\hat{r}_0$) in accordance with the following formula:

$$\hat{r}_0 = \text{sign}(a_y) \frac{\sqrt{|a_{y1}-a_{y2}|}}{L_y}$$

where "sign" represents the sign of the variable ($a_y$), $a_y$ is the vehicle acceleration at its center of gravity (CG), $L_y$ is the distance between the two accelerometers along the width of the vehicle, and $a_{y1}$ and $a_{y2}$ represent the sensed lateral accelerations;

determining the lateral acceleration ($a_y$) at the CG in accordance with the following formula:

$$a_y = \frac{a_{y1}+a_{y2}}{2};$$

measuring steering angle ($\delta$) of the vehicle steering wheel;

measuring the vehicle forward speed ($u_0$); and estimating vehicle yaw rate based upon $\hat{r}_0$, $a_y$, $\delta$ and $u_0$.

2. The method of claim 1, wherein said step of estimating vehicle yaw rate comprises weighting the kinematic estimate of yaw rate ($\hat{r}_0$) and the lateral acceleration ($a_y$) at the CG based upon sensor noise characteristics.

3. The method of claim 2, wherein said step of weighting further comprises incorporating gain scheduling into the estimated yaw rate based upon the measured steering angle and vehicle forward speed.

4. The method of claim 3, wherein the step of weighting further comprises incorporating an estimate of surface coefficient of friction.

5. The method of claim 3, wherein said step of sensing lateral acceleration of the vehicle comprises providing first and second accelerometers on the vehicle, each said accelerometer having a sensitive axis disposed laterally with respect to the vehicle.

6. An apparatus for estimating vehicle yaw rate, comprising:

first and second lateral accelerometers secured to the vehicle for measuring lateral acceleration ($a_{y1}, a_{y2}$);

means for measuring steering angle ($\delta$) of the vehicle steering wheel;

means for measuring the vehicle forward speed ($u_0$);

a microcontroller in electrical communication with said accelerometers and with said means for measuring steering angle and forward speed, said microcontroller being operative to:

determine a kinematic estimate of yaw rate ($\hat{r}_0$) in accordance with the following formula:

$$\hat{r}_0 = \text{sign}(a_y) \frac{\sqrt{|a_{y1} - a_{y2}|}}{L_y}$$

determine the lateral acceleration ($a_y$) at the CG in accordance with the following formula:

$$a_y = \frac{a_{y1} + a_{y2}}{2};$$

estimate vehicle yaw rate based upon $\hat{r}_0$, $a_y$, $\delta$ and $u_0$.

7. The apparatus of claim 6, wherein said microcontroller is further operative to weight the kinematic estimate of yaw rate ($\hat{r}_0$) and the lateral acceleration ($a_y$) at the CG based upon sensor noise characteristics, and to incorporate gain scheduling into the estimated yaw rate based upon the measured steering angle, vehicle forward speed, and estimated surface coefficient of friction.

8. The apparatus of claim 6, wherein said lateral accelerometers comprise sensitive axes disposed laterally with respect to the vehicle.

9. A method of estimating vehicle yaw rate, comprising:

sensing lateral acceleration ($a_{CG}$) of the vehicle at the vehicle center of gravity (CG);

measuring steering angle ($\delta$) of the vehicle steering wheel;

measuring the vehicle forward speed ($u_0$);

using a Kalman filter to estimate vehicle yaw rate based upon $a_{CG}$, $\delta$, and $u_0$; and incorporating gain scheduling into the yaw rate estimate.

* * * * *